US008602621B2

(12) United States Patent
Li et al.

(10) Patent No.: US 8,602,621 B2
(45) Date of Patent: Dec. 10, 2013

(54) OPTICAL ELEMENT AND LIGHT SOURCE COMPRISING THE SAME

(75) Inventors: Yun Li, Shanghai (CN); Ye Liu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 199 days.

(21) Appl. No.: 13/143,608

(22) PCT Filed: Jan. 5, 2010

(86) PCT No.: PCT/IB2010/050018
§ 371 (c)(1),
(2), (4) Date: Jul. 7, 2011

(87) PCT Pub. No.: WO2010/079439
PCT Pub. Date: Jul. 15, 2010

(65) Prior Publication Data
US 2011/0273900 A1    Nov. 10, 2011

(30) Foreign Application Priority Data

Jan. 9, 2009  (CN) .......................... 2009 1 0002621

(51) Int. Cl.
*F21V 7/04*    (2006.01)
*F21V 7/00*    (2006.01)
*F21V 3/00*    (2006.01)
*F21V 5/00*    (2006.01)
*H01L 33/00*    (2010.01)

(52) U.S. Cl.
USPC ...... 362/555; 362/308; 362/311.06; 362/334; 362/337

(58) Field of Classification Search
USPC ............ 362/555, 308–309, 311.06, 334, 337, 362/339
See application file for complete search history.

(56) References Cited

U.S. PATENT DOCUMENTS

| 5,276,591 | A |   | 1/1994 | Hegarty |
| 7,270,454 | B2 | * | 9/2007 | Amano .......................... 362/522 |
| 7,275,849 | B2 | * | 10/2007 | Chinniah et al. .............. 362/555 |
| 7,413,325 | B2 | * | 8/2008 | Chen ........................ 362/249.01 |
| 7,699,504 | B2 | * | 4/2010 | Sun et al. ..................... 362/332 |
| 7,976,206 | B2 | * | 7/2011 | Wu et al. ....................... 362/555 |
| 8,292,471 | B2 | * | 10/2012 | Boonekamp et al. ..... 362/311.02 |
| 2002/0136027 | A1 | * | 9/2002 | Hansler et al. ................. 362/559 |
| 2003/0185005 | A1 |   | 10/2003 | Sommers et al. |
| 2009/0109699 | A1 | * | 4/2009 | Grotsch et al. ................ 362/555 |
| 2010/0097821 | A1 | * | 4/2010 | Huang et al. .................. 362/555 |
| 2011/0267836 | A1 | * | 11/2011 | Boonekamp et al. .......... 362/555 |

FOREIGN PATENT DOCUMENTS

EP    1596125 A1    11/2005
WO   2006033032 A1    3/2006

* cited by examiner

*Primary Examiner* — David J Makiya
(74) *Attorney, Agent, or Firm* — Mark Beloborodov

(57) ABSTRACT

The present invention relates to an optical element including a light guide, into which light from one or more light-emitting diodes in a light unit arranged at one end of the light guide is injected, and a reflector arranged at the other end of the light guide capable of reflecting light incident on the reflector. The light guide further includes a prismatic surface comprising a plurality of prisms, each prism being arranged at an angle to an axial direction of the light guide, for guiding the light emitted from the light unit towards the output end of the light guide. The present invention also relates to a light source including an optical element according to the present invention, the light source being arranged for retrofitting into a luminaire employing an incandescent light source.

13 Claims, 4 Drawing Sheets

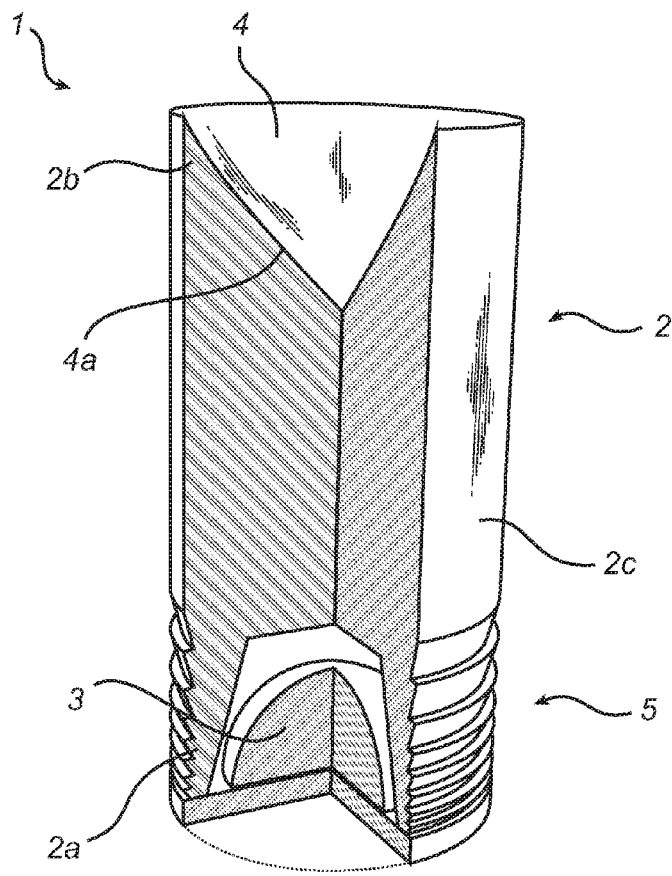
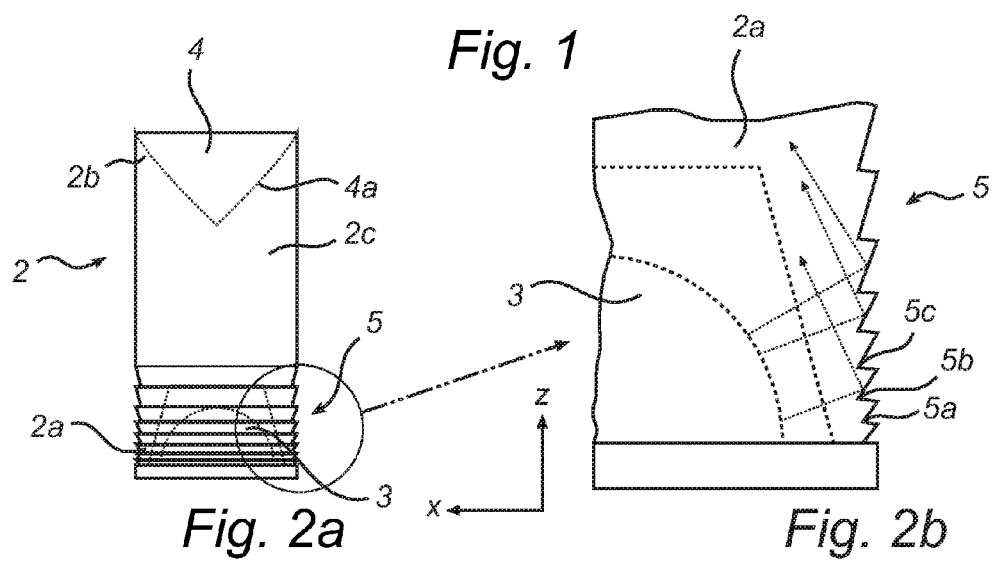
Fig. 1
Fig. 2a
Fig. 2b

OPTICAL ELEMENT AND LIGHT SOURCE COMPRISING THE SAME

FIELD OF THE INVENTION

The present invention generally relates to the field of lighting design. In particular, the present invention relates to a light emitting diode (LED) optical element and a light source arranged for retrofitting in luminaires employing incandescent light sources, such as light bulbs.

BACKGROUND OF THE INVENTION

Conventional incandescent light sources generally convert an electrical current to light by applying a current to a filament, typically made of tungsten, which causes the filament to glow. The filament is generally suspended near the center of a glass bulb, thereby providing light having a radial distribution that can be used to illuminate, e.g., a room. Such conventional incandescent light sources are typically used in chandeliers. Due to the high brightness of the glowing filament ($\sim$1 Mcd/m$^2$), crystals in the chandelier exhibit decorative sparkling light effects. However, the life span of incandescent light sources is typically relatively short, usually limited to the life span of the filament. In addition, the glass bulb generally becomes very hot due to the high temperature of the filament, presenting a potential danger of burning objects that come into contact with the glass bulb.

Replacing incandescent light sources with LED light sources generally alleviates or eliminates the above problems. In addition, such a replacement provides a significant increase in the efficacy, that is the luminous flux produced by the light source as a ratio to the amount of energy (or power) required to produce it. However, most LEDs are only capable of emitting light into a hemisphere (solid angle $2\pi$ sr), whereas incandescent light sources employing a glowing filament generally emits light uniformly into a full sphere (solid angle $4\pi$ sr).

To overcome this disadvantage, a light source may be provided comprising a cylindrical light guide having a reflector arranged at one end thereof and one or more LEDs arranged at the other end and being situated in a cylindrically shaped cavity having reflecting walls around the LEDs. Such a configuration may allow for achieving a large variety of light intensity distributions of the light source. However, such a configuration in general requires a highly reflective foil or the like to be laminated on the inner walls of the cavity in order to achieve a high optical efficiency for the light source. Another similar approach is to utilize the lower part of the light guide as a reflecting cavity. Thus, according to this approach, the cylindrically shaped cavity housing the LEDs is not required. Such a configuration generally requires that reflective coating is applied to the lower portion of the light guide. Both approaches can be used for achieving a light source having a high optical efficiency.

However, such reflective foils or coatings may increase the cost of the overall device in that additional material as well as additional manufacturing steps may be required. Moreover, the above approaches generally require the dimensions of the light guide to be relatively large, whereas it is generally desirable in lighting design to keep the dimensions as small as possible.

SUMMARY OF THE INVENTION

In view of the above, it is an object of the present invention to provide an optical element capable of emitting light having a light intensity distribution similar to an incandescent light source, which optical element has a low cost and allows for easier manufacturing in comparison with conventional devices.

It is another object of the present invention to provide a LED light source having a light intensity distribution similar to an incandescent light source, which light source has a low cost and allows for easier manufacturing in comparison with conventional devices.

These and other objectives are completely or partially achieved by an optical element and a light source in accordance with the independent claims.

According to a first aspect of the present invention, there is provided an optical element including a light transmissive light guide having an input end, an output end, and a central region therebetween, which light guide extends along an axial direction. The optical element further includes a light unit, including at least one LED, which light unit is arranged adjacent to the input end for injecting light into the central region, and a reflector, which is arranged such that at least a portion of light incident on the reflector is reflected. The light guide is arranged such that its refractive index is higher than the refractive index of the medium exterior to the light guide, and at least a portion of the interior boundary surface of the light guide includes a prismatic surface comprising a plurality of prisms arranged in a succession along the axial direction, where each prism is arranged at an angle to the axial direction.

The prisms of the prismatic surface comprising at least a portion of the interior boundary surface of the light guide allow for reflection of light emitted from the light unit back into the light guide. The angle of the prisms to the axial direction can be chosen such that most of the light emitted from the light unit and reflected on the prisms is transported towards the output end of the light guide with minimal multireflection of light occurring in the light guide adjacent to the input end. The angle of the prisms to the axial direction may be chosen such that it is large enough for total internal reflection of light incident on the prisms. Alternatively, the extension in the axial direction of each prism and/or the angle to the axial direction may in general be chosen individually to obtain the desired reflection angle.

By such a configuration, the dimensions of the light guide can be kept small, even if relatively a large-sized LED is employed in the light unit, such as a 4 W Acriche LED from Seoul Semiconductors. Furthermore, the optical element does not require any additional reflective foils or the like, thereby lowering the cost of the optical element and/or simplifying manufacturing thereof. For instance, the configuration of the light guide allows for manufacturing the light guide by injection moulding, because the light guide may be configured such that the pitch of the prisms along the axial direction (the distance in the axial direction between adjacent prisms on the prismatic surface) is relatively large. For example, the light unit may then be mounted on a substrate, such as a printed circuit board (PCB), and the light guide can subsequently be directly mounted on the PCB. At the same time, the configuration of the light guide allows for maintaining, or improving, the optical efficiency of the optical element compared to conventional devices. Furthermore, according to the configuration of the optical element, there is no need for having the light unit arranged in a reflecting cavity. Thereby, any multireflection in the lower, input end of the light guide may essentially be eliminated, and thus reflection of light emitted from the light unit and injected into the light guide back to the light unit can substantially be avoided. This also allows for keeping the dimensions of the light guide small.

According to a second aspect of the present invention, there is provided a light source arranged for retrofitting into a luminaire employing an incandescent light source, including an optical element according to the first aspect of the present invention or embodiments thereof. Thus, there is provided a LED light source that generally is easier to manufacture than conventional LED light sources, while maintaining the same or improved optical efficiency as compared to conventional LED light sources. Furthermore, by such a configuration, there is provided a light source that overcomes or alleviates the disadvantages of conventional incandescent light sources, as previously described, as well as provides a significant increase in the efficacy of the light source.

In the context of the present invention, by the term "retrofitting" it is meant fitting into a light fixture normally used for incandescent light sources, such as a filamented light bulb, a halogen lamp, etc. In other words, by retrofitting the light source according to the present invention into a luminaire normally employing an incandescent light source it is meant replacing the incandescent light source in the luminaire with the light source according to the present invention.

Furthermore, in the context of the present invention, by the term "optical efficiency" it is meant the ratio of the luminous flux outputted from the optical element (or the light source) and the initial amount of the installed luminous flux.

Also, in the context of the present invention, by the term "interior boundary surface" it is meant the surface of the interface between the light guide and the immediate surroundings of the light guide, which surface has a normal facing inwards in the light guide.

According to an embodiment of the present invention, the extension in the axial direction of at least one of the prisms is different from the extension in the axial direction of other prisms. According to another embodiment of the present invention, at least one of the prisms is arranged at an angle to the axial direction that is different from the angle to the axial direction of other prisms. According to yet another embodiment of the present invention, the extension in the axial direction of each prism is different from the extension in the axial direction of the other prisms. Furthermore, according to yet another embodiment of the present invention, the angle to the axial direction of each prism is different from the angle to the axial direction of the other prisms. By each of these four configurations above, there is achieved an increased adaptiveness in terms of employing LEDs of varying dimensions and number in the light unit, without substantially complicating the manufacturing process of the optical element, while still maintaining, or improving, the optical efficiency of the optical element compared to conventional devices.

According to yet another embodiment of the present invention, the prismatic surface is arranged in close proximity to the input end of the light guide. In this manner, any multireflection of light in the light guide adjacent to the input end can be further minimized, because the prisms may effectively guide the majority of the light emitted from the light unit to the output end of the light guide.

According to yet another embodiment of the present invention, the reflector comprises one or more of the following: a metal coating, such as an aluminum coating, an interference filter, such as a multilayer of thin $SiO_2$ and $ZrO_2$ layers, a diffuse coating, and a phosphor coating. By the diffuse coatings, the brightness of the emitted light can be considerably reduced, which can be desirable in some applications for improving visual comfort. By applying a metal coating, such as aluminum, there is achieved a relatively inexpensive, yet highly reflecting, surface.

According to yet another embodiment of the present invention, at least one reflecting facet is arranged on the reflecting surface such that at least a portion of light incident on the facet is reflected. Such a reflecting facet can be used to create substantial light intensity variations as a function of the viewing angle of the user. Thus, by such a configuration, an optical, light-emitting device may be provided that exhibits strong viewing-angle dependent sparkling light effects.

According to yet another embodiment of the present invention, the reflector comprises at least one transmitting portion arranged such that at least a portion of light incident on the transmitting portion is transmitted through the reflector. According to another embodiment, the transmitting portion comprises a through hole extending along an axis. For example, the axis can be a straight axis being coincident or parallel with the axial direction of the light guide. By these configurations, an almost viewing-angle independent light intensity can be achieved, because light is allowed to either pass through the transmitting portion or be reflected at the reflector. Thus, the emitted light may be such that it is emitted substantially uniformly into a full sphere (solid angle $4\pi$ sr), substantially similar to the light intensity distribution of an incandescent light source.

According to yet another embodiment of the present invention, the light guide comprises a color mixing rod extending along the axial direction, wherein the color mixing rod comprises at least a portion of the central region of the light guide. The color mixing rod is arranged for mixing light from multiple sources (i.e. the one or more LEDs in the light unit) and may have a hexagonal cross section. It is also envisaged that the color mixing rod may have a square cross section when viewed in a plane perpendicular to the axial direction. Both of these so-called hexagonal and square color mixing rods are very effective for mixing light of various colors.

According to yet another embodiment of the present invention, the reflecting surface is arranged such that at least a portion of the reflecting surface is one of concave and convex. By this configuration, light from the light source may have a spatial intensity distribution that is substantially similar to the light intensity distribution of an incandescent light source. Furthermore, by the particular choice of the concave or convex shape of said at least a portion of the reflecting surface, the light flux from the light source may be substantially symmetric with respect to a plane perpendicular to the axial direction, or asymmetric, depending on the requirements of the desired lighting application. Thus, in the present embodiment, a large variety of light sources employing LEDs may be manufactured, each in general having different light intensity characteristics than the other light sources according to particular user needs and/or lighting environment requirements. By the terms "concave" and "convex" it is meant curving in, or hollowed inward, and curving out, or bulging outward, respectively.

According to an embodiment of the present invention, the light source further includes at least one translucent envelope at least partly surrounding the optical element. By such a configuration, the optical performance (that is, the light intensity distribution) or visual comfort (for example, reduction of brightness) can be improved. The at least one translucent envelope may comprise light scattering elements (arranged on the at least one translucent envelope). In this manner, the brightness of the light source can be decreased and/or the light intensity distribution of the light source can be smoothened.

It will be appreciated that such a translucent envelope can also be used to provide a decorative enhancement in that it can be arranged so that it hides other optical elements of the light source from the view of the user. For example, by a suitable surface treatment, the translucent envelope can be arranged such that it exhibits a frosted appearance, or, optionally or alternatively, the translucent envelope can be arranged such that it is slightly colored by pigments dispersed in the material of which the translucent envelope is made.

According to yet another embodiment of the present invention, the light source further includes a base onto which the light unit is arranged, which base includes an electrical connector arranged to mate with a socket connector of a luminaire or light fixture. The base further includes electrical circuitry connected to the electrical connector, which electrical circuitry is arranged to receive electrical power from the electrical connector and, by means of the electrical power, operate the light unit. In this manner, an easy fitting of the light source into a light fixture or luminaire normally employing an incandescent light source is achieved. The light source may further include a heatsink device arranged in the base, which heatsink device is adapted to dissipate heat generated by the light unit. Thus, the surfaces of the light source can be kept relatively cool to avoid burns to a user caused by contact with the light source. Furthermore, the life span of the light source can be increased due to less thermal stress and/or strain in the light source components.

According to yet another embodiment of the present invention, the base comprises a PCB. Thus, the light unit may be directly mounted on the PCB, which provides adaptivity in terms of capacity requirements (for example, power requirements) and also facilitates manufacturing of the light source.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, unit, means, step, etc]" are to be interpreted openly as referring to at least one instance of said element, device, component, unit, means, step, etc., unless explicitly stated otherwise.

It is noted that the present invention relates to all possible combinations of features recited in the claims.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals are used for identical or similar elements, wherein:

FIG. 1 is a schematic sectional view of an exemplary embodiment of the present invention;

FIG. 2a is a schematic sectional side view of an exemplary embodiment of the present invention for describing the working principles of the present invention;

FIG. 2b is a section view of a portion of the embodiment illustrated in FIG. 2a;

DETAILED DESCRIPTION OF EMBODIMENTS

Figure 3A:
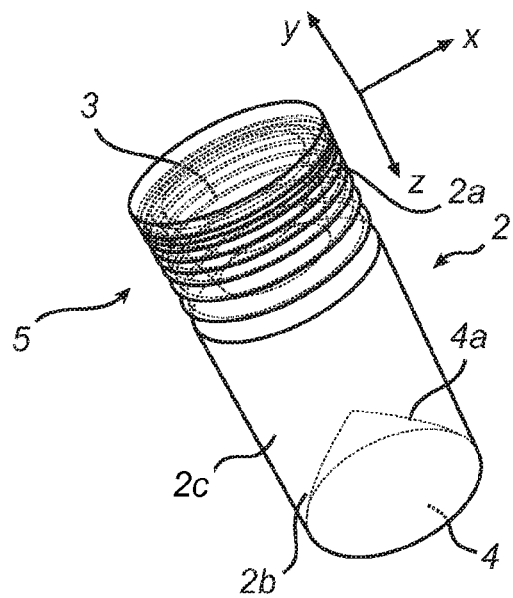
FIG. 3a is a schematic view of an exemplary embodiment of the present invention.

FIG. 1 is a schematic sectional view illustrating an exemplary embodiment of the present invention, wherein the optical element 1 comprises a light transmissive light guide 2 extending along an axial direction (the z-axis), the light guide 2 having an input end 2a, an output end 2b, and a central region 2c therebetween. The optical element 1 further comprises a light unit 3 comprising one or more LEDs, in this particular case a single large-sized LED, such as an Acriche LED from Seoul Semiconductors, and a reflector 4 having a reflective surface 4a facing the output end 2b of the light guide 2. The reflecting surface 4a thereby has a normal (not shown) directed towards the output end 2b of the light guide 2. According to the illustrated example, the reflective surface 4a is arranged such that at least a portion of the reflective surface 4a is concave, that is curving inwards into the light guide 2 (generally towards the input end 2a). As illustrated in FIG. 1, the light guide 2 further comprises a prismatic surface 5, which will be further described in the following.

It is to be understood that although the appended drawings illustrate light guides comprising a prismatic surface on both sides of the interface between the interior of the light guide and the exterior of the light guide, it is only necessary for the light guide to comprise such a prismatic surface on the side of the interface between the interior of the light guide and the exterior of the light guide having a normal pointing inwards into the light guide, in order to achieve the advantages of the present invention (in other words, only the interior boundary surface of the light guide is required to comprise such a prismatic surface for achieving the advantages of the present invention).

The reflector 4 shown in FIG. 1 is configured such that at least a portion of light that is incident on the reflector 4 is reflected. The fraction of light reflected from the reflector 4 depends on the reflectivity of the reflector 4. The reflector 4 is further arranged so that it has a reflecting surface 4a that faces the output end 2b and covers at least a portion of the output end 2b. For example, between 80% and 90% of the surface of the output end 2b may be covered by the reflecting surface 4a. Alternatively, the reflecting surface 4a may completely cover the surface of the output end 2b. The reflector 4, or alternatively the reflecting surface 4a, may, for example, comprise one or more of the following: a metal coating, such as highly reflective aluminum, a high-reflectance interference filter, such as a multilayer of thin $SiO_2$ and $ZrO_2$ layers, a white diffuse coating, and a phosphor coating. The interference filter may be arranged such that it deliberately transmits a small portion of light incident thereon, for example such that it transmits about 4% of the light incident thereon and reflects the remainder of the incident light. By the diffuse coatings, the brightness of the light emitted from the optical element may be considerably reduced, which can be desirable in some applications for improving visual comfort. The diffuse coatings may also be arranged such that they are transflective.

The light guide 2 may have a cylindrical shape, although the present invention is not limited to this particular case. On the contrary, any geometric shape of the light guide 2 suitable for achieving the functions and capabilities of the optical element 1 is contemplated to be within the scope of the present invention. It is also contemplated that the light guide 2 may be slightly tapered towards the input end 2a, i.e. the dimensions of the light guide 2 in a plane defined by the axial direction and a transversal direction perpendicular to the axial direction may become progressively larger along the axial direction towards the output end 2b. In the exemplary case of the light guide 2 having a cylindrical shape, this would mean that the diameter of the light guide 2 becomes progressively larger with the distance along the axial direction towards the output end 2b. The light guide 2 may be made of a substance selected from the group of transparent polymers, polymer compounds, glass, polycarbonate, polymethylmethacrylate, acrylic, other types of plastics, and combinations thereof.

FIG. 2a is a schematic sectional side view illustrating an exemplary embodiment of the present invention, wherein the reflective surface 4a is arranged such that at least a portion of the reflective surface 4a is concave, that is curving inwards into the light guide 2 (generally towards the input end 2a).

FIG. 2b is a view of the exemplary embodiment illustrated in FIG. 2a showing a partial close-up view of the light guide 2.

The working principles of the optical element 1 according to an exemplary embodiment of the present invention is now described with reference to FIGS. 2a and 2b. Light emitted from the LED (or LEDs) in the light unit 3 is injected (transmitted) into the central region 2c of the light guide 2. It is to be understood that a small portion of the light from the LED is reflected at the light guide boundary at the input end 2a, typically about 4%, with the rest of the light being injected into the central region 2c of the light guide 2. The light in the light guide 2 is then generally transported along the extension of the light guide 2 towards the output end 2b.

The prisms 5a, 5b, 5c, ... (of which only some are indicated by reference numerals in FIG. 2b) of the prismatic surface 5 comprising a portion of the interior boundary surface 2c of the light guide 2, as illustrated in FIG. 2b, allow for reflection of light emitted from the light unit 3 back into the light guide 2. The angle of the prisms 5a, 5b, 5c, ... to the axial direction may be chosen in such a way that most of the light that is emitted from the light unit 3 and reflected on the prisms 5a, 5b, 5c, ... is transported towards the output end 2b of the light guide 2 with minimal multireflection of light occurring in the light guide 2 adjacent to the input end 2a. The angle of the prisms 5a, 5b, 5c, ... to the axial direction may be chosen such that it is large enough for total internal reflection of light incident on the prisms. Alternatively, the extension of each prism in the axial direction of the light guide 2 and/or the angle of each prism to the axial direction of the light guide 2 may in general be chosen individually to obtain the desired reflection angle. Further alternatives are to choose different extensions in the axial direction and/or different angles to the axial direction for all of the prisms 5a, 5b, 5c, .... Thus, by the configuration of the light guide 2, in particular by the configuration of the prismatic surface 5, most of the light emitted from the light unit 3 may be reflected upwards, that is in the general direction from the input end 2a to the output end 2b, in the light guide 2, without the need for, e.g., additional reflective coating arranged in the light unit 2, as in conventional devices.

For instance, such a configuration of the light guide 2 allows for easy manufacturing of the light guide 2 by injection moulding, because the light guide 2 may be configured such that the pitch of the prisms 5a, 5b, 5c, ... along the axial direction (the distance in the axial direction between adjacent prisms on the prismatic surface) is relatively large. For example, the light unit 3 may then be mounted on a substrate, such as a PCB, and the light guide 2 can subsequently be directly mounted on the substrate.

Also, by this configuration, the overall dimensions of the optical element can be kept small. For instance, according to an exemplary case, for a light unit comprising a single LED having an emitting surface of about 4 mm×4 mm and a LED dome having a diameter of about 10 mm (which is typical for a 4 W Acriche type LED from Seoul Semiconductors), the diameter of the light guide (assuming the exemplary case of a cylindrical light guide) can be as small as about 12 mm. The height of the light guide typically is about 25 mm. Assuming these conditions, and further assuming that the reflecting surface 4a has a reflection coefficient of about 90%, an optical efficiency of the optical element being greater than about 85% may be achieved (with the Fresnel loss of each optical surface in the optical element taken into account).

In the context of the present invention, by the term "interior boundary surface" it is meant the surface of the interface between the light guide 2 and the immediate surroundings of the light guide 2, which surface has a normal facing inwards in the light guide 2.

The light guide 2 is preferably configured such that the index of refraction of the light guide 2 is higher than the index of refraction of the medium exterior to the light guide 2, which exterior medium typically is air having an index of refraction of about 1. In other words, the light guide 2 is preferably arranged such that it has a higher optical density than the medium exterior to the light guide 2. Typically, the light guide 2 is arranged such that it has an index of refraction of about 1.5 or higher, although it is not limited to this specific case.

The transportation of light in the light guide 2 is based on total internal reflection. Light travelling in the light guide 2 generally does not exit the light guide 2 when it reaches the boundary between the light guide 2 and the medium exterior to the light guide 2, which medium is less optically dense than the light guide 2, but is reflected back into the light guide 2. On one hand, when the angle of incidence of the light incident on said boundary is larger than the critical angle (that is, the angle of incidence at which light is refracted so that it travels along the boundary surface), the light is reflected back without loss. On the other hand, for increasingly lower angles of incidence, an increasingly larger fraction of the incident light will be transmitted through the boundary surface out from the light guide 2.

In the context of the present invention, by the term "angle of incidence" it is meant the angle between a ray of light incident on a surface and the normal of the surface at the point of incidence, unless otherwise specified.

When light from the light unit 3 thus transported in the light guide 2 hits the reflecting surface 4a of the reflector 4, a fraction of the light is reflected depending on the reflectivity of the reflecting surface 4a. For example, the reflecting surface 4a may be arranged such that it has a reflection coefficient close to 1 or substantially 1. By the shape of the reflecting surface 4a, most of the light reflected from the reflecting surface 4a is refracted at the interface between the light guide 2 and the medium exterior to the light guide 2, namely the interior boundary surface, and subsequently leaves the light guide 2. By a suitable choice of the shape of the reflecting surface 4a, the intensity of the light that leaves the light guide 2 after having been reflected at the reflecting surface 4a may be substantially similar to the light intensity of an incandescent light source. Two such shapes have been illustrated by way of the non-limiting examples in FIG. 1 and FIG. 2a.

FIG. 3a is a schematic view illustrating an exemplary embodiment of the present invention. The optical element shown in FIG. 3a is in many respects similar to the optical element described with reference to FIG. 1.

Figure 3B:
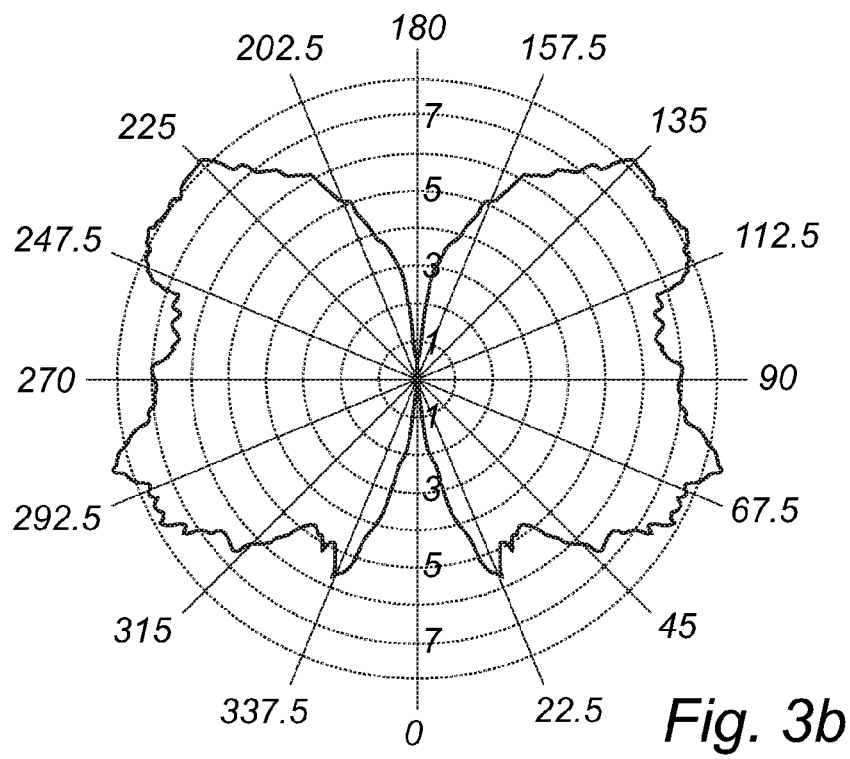
FIG. 3b is an exemplary light intensity profile of the far-field angular light intensity distribution of light emitted from an optical element according to an exemplary embodiment of the present invention.

FIG. 3b is an exemplary light intensity profile of the far-field angular light intensity distribution of light leaving the light guide 2 of the optical element shown in FIG. 3a. The full three-dimensional intensity is a surface of revolution around the axial direction (the z-axis). The light intensity profile shown in FIG. 3b is based on the exemplary case as described previously, comprising a single LED having an emitting surface of about 4 mm×4 mm and a LED dome having a diameter of about 10 mm (typical for a 4 W Acriche type LED).

Figure 4:
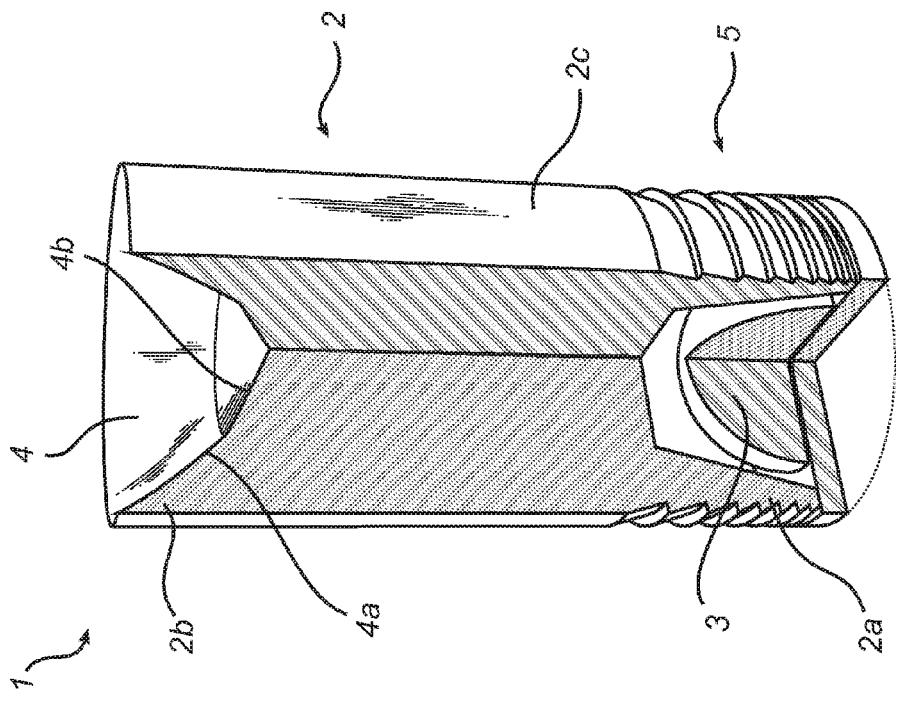
FIG. 4 is a schematic sectional view of another exemplary embodiment of the present invention.

FIG. 4 is a schematic sectional view illustrating an exemplary embodiment of the present invention, wherein the reflector 4 further comprises a transmitting portion 6 being arranged such that at least a portion of light incident on the transmitting portion 6 is transmitted through the reflector 4 such that light from the light guide 2 may leave the optical element by either passing through the transmitting portion 6 or by being reflected at the reflector 4 and subsequently coupled out from the light guide 2. By this configuration, an almost viewing-angle independent light intensity can be achieved. It is to be understood that the transmitting portion 6 may also extend along an axis that is at an angle to the axial direction. The axis along which the transmitting portion 6 extends is preferably straight, although transmitting portions 6 that are curved to some degree may also be contemplated. For example, the transmitting portion 6 may be a portion of the reflector 4 that is not covered with a reflective material. The transmitting portion 6 may also comprise a through hole extending along the axial direction (the z-axis), allowing light to pass through the hole. In addition, some of the light may be reflected at the reflector 4. Any of the optical elements of the previously described embodiments and the embodiments described in the following may comprise such a transmitting portion 6 or through hole.

Figure 5:
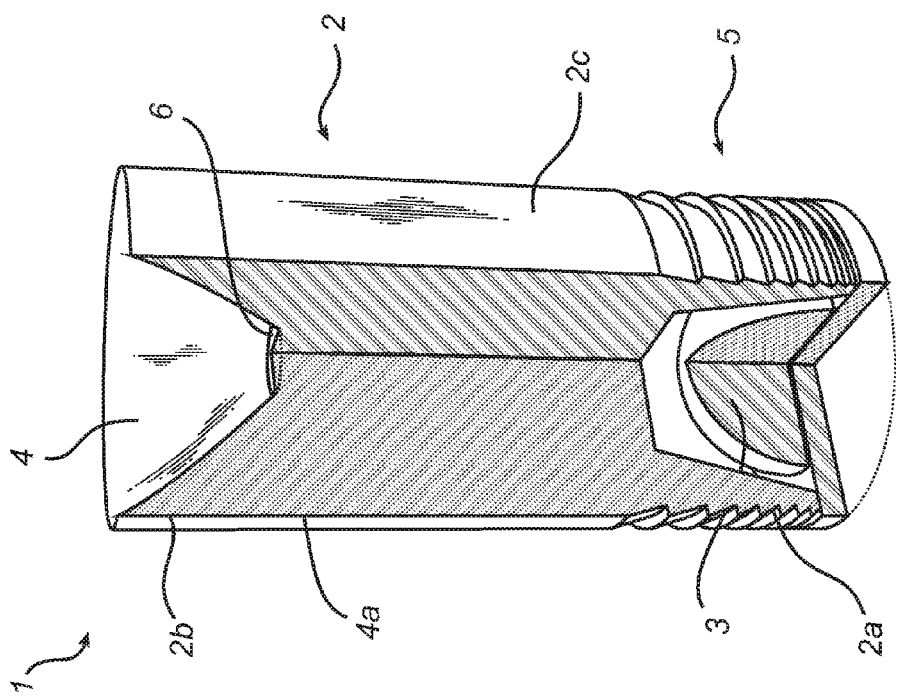
FIG. 5 is a schematic sectional view of yet another exemplary embodiment of the present invention.

FIG. 5 is a schematic sectional view illustrating an exemplary embodiment of the present invention, wherein the reflecting surface 4a has been provided with a reflecting facet 4b arranged such that at least a portion of the light incident on the facet 4b is reflected. Any of the optical elements of the previously described embodiments and the embodiments described in the following may comprise such a reflecting facet 4b. Furthermore, it is to be understood that other embodiments comprising any suitable number of facets also are within the scope of the present invention. Such a facet 4b can be used to create substantial light intensity variations as a function of the viewing angle of the user. By such a configuration, thus capable of creating substantial spatial light intensity variations, an optical element or a LED light source may be designed with enhanced viewing-angle dependent sparkling effects, for example when used in a luminaire (such as a chandelier).

Figure 6:
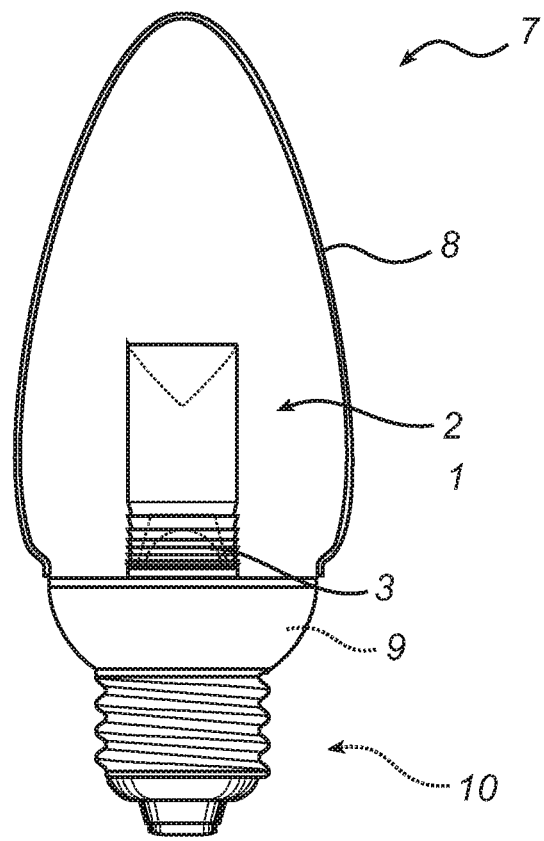
FIG. 6 is a schematic view of yet another exemplary embodiment of the present invention.

FIG. 6 is a schematic view illustrating a light source 7 according to an exemplary embodiment of the present invention, the light source 7 being arranged for retrofitting into a luminaire or light fixture (not shown) normally employing an incandescent light source, including an optical element 1 according to the present invention or embodiments thereof. The optical element 1 may optionally be at least partly surrounded by one or more translucent envelopes 8, such as illustrated in FIG. 6. The light source 7 may further include a base 9, onto which the optical element is arranged or to which the optical element 1 is coupled to, which base 9 comprises an electrical connector 10, preferably threaded, which is arranged such that it is capable of mating with a socket connector (not shown), preferably threaded, of a luminaire (not shown) employing an incandescent light source, such as a filamented light bulb or a halogen lamp. The base 9 may further comprise a heatsink device (not shown) arranged for dissipating heat generated by the light unit 3. By the heatsink device, the components of the light source can be kept cooler, thus lessening thermal strains and/or strain in the light source components, and as a consequence, prolonging the life span of the light source. Furthermore, any possible burns inflicted on a user by contact with the light source may be avoided.

A translucent envelope 8, such as illustrated in FIG. 6, can conveniently be used to improve the optical performance (that is, the light intensity distribution) or visual comfort (for example, reduce the brightness). Optionally, a translucent envelope 8, such as a clear glass bulb, can be provided with light scattering elements arranged onto the translucent envelope 8 in order to, e.g., decrease the brightness and smoothen the light intensity distribution. The translucent envelope 8 may also be used to provide a decorative enhancement in that it can be arranged so that it hides other optical elements from being viewed by the user. For example, by a suitable surface treatment, the translucent envelope 8 may be arranged such that it exhibits a frosted appearance, or, optionally or alternatively, the translucent envelope 8 may be arranged such that it is slightly colored by pigments dispersed in the material of which the translucent envelope 8 is made, for example a clear polymer.

In the context of the present invention, by the term "retrofitting" it is meant fitting into a light fixture normally used for incandescent light sources, such as a filamented light bulb, a halogen lamp, etc. In other words, by retrofitting the light source according to the illustrated embodiment into a luminaire normally employing an incandescent light source it is meant replacing the incandescent light source in the luminaire with the light source according to the illustrated embodiment.

In conclusion, the present invention is related to an optical element including a light guide, into which light from one or more LEDs in a light unit arranged at one end of the light guide is injected, and a reflector arranged at the other end of the light guide capable of reflecting light incident on the reflector. The light guide further includes a prismatic surface comprising a plurality of prisms, each prism being arranged at an angle to an axial direction of the light guide, for guiding the light emitted from the light unit towards the output end of the light guide.

The present invention has mainly been described above with reference to a few embodiments. However, as is readily appreciated by a person skilled in the art, other embodiments than the ones disclosed above are equally possible within the scope of the present invention, as defined by the appended claims.

The invention claimed is:

1. An optical element, comprising:
a light transmissive light guide having an input end, an output end, and a central region therebetween, the light guide extending along an axial direction;
a light unit including at least one light emitting diode (LED) and arranged adjacent to the input end for injecting light into the central region; and
a reflector being arranged adjacent to the output end such that at least a portion of light incident on the reflector is reflected,
wherein an index of refraction of the light guide is higher than the index of refraction of a medium exterior to the light guide; and
wherein at least a portion of an interior boundary surface of the light guide includes a prismatic surface comprising a plurality of prisms arranged in a succession along the axial direction, each of the prisms being arranged at a respective angle to the axial direction, and
wherein at least one of the prisms is configured to reflect light directly received from the light unit primarily in a direction that is nonparallel with respect to a direction in which at least one other prism of the plurality of prisms primarily reflects other light received directly from the light unit.

2. The optical element according to claim 1, wherein an extension in the axial direction of the at least one of the prisms is different from an extension in the axial direction of the at least one other prism.

3. The optical element according to claim 1, wherein the angle to the axial direction of the at least one of the prisms is different from the angle to the axial direction of the at least one other prism.

4. The optical element according to claim 1, wherein an extension in the axial direction of each prism of the plurality of prisms is different from an extension in the axial direction of each of the other prisms of the plurality of prisms.

5. The optical element according to claim 1, wherein the respective angle to the axial direction of each prism of the plurality of prisms is different from the respective angle to the axial direction of each of the other prisms of the plurality of prisms.

6. The optical element according to claim 1, wherein the reflector has a reflecting surface facing the output end and covering at least a portion of the output end, wherein the reflecting surface is arranged such that at least a portion of the reflecting surface is one of concave and convex.

7. The optical element according to claim 1, wherein at least one reflecting facet is arranged on the reflecting surface such that at least a portion of light incident on the facet is reflected.

8. The optical element according to claim 1, wherein the reflector comprises at least one transmitting portion being arranged such that at least a portion of light incident on the at least one transmitting portion is transmitted through the reflector.

9. The optical element according to claim 1, wherein the reflector comprises one or more of the following:
   a metal coating;
   an interference filter;
   a diffuse coating; and
   a phosphor coating.

10. The optical element according to claim 1, wherein the light guide comprises a substance selected from the group consisting of transparent polymers, polymer compounds, glass, polycarbonate, polymethylmethacrylate, acrylic, plastic, and combinations thereof.

11. A light source arranged for retrofitting into a luminaire employing an incandescent light source, including an optical element according to claim 1.

12. The light source according to claim 11, further comprising at least one translucent envelope at least partly surrounding the optical element.

13. The light source according to claim 11, further comprising a base onto which the light unit is arranged, the base including an electrical connector arranged to mate with a socket connector of a luminaire employing an incandescent light source, the base further including electrical circuitry connected to the electrical connector, wherein the electrical circuitry is arranged to be able to receive power from the electrical connector, and, by means of the power, operate the light unit.

* * * * *